United States Patent
Shu et al.

(10) Patent No.: US 8,543,092 B2
(45) Date of Patent: Sep. 24, 2013

(54) ACCESS METHOD OF NETWORK TERMINALS, ACCESS SYSTEM AND GATEWAY

(75) Inventors: Guiming Shu, Shenzben (CN); Shu Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 674 days.

(21) Appl. No.: 12/342,338

(22) Filed: Dec. 23, 2008

(65) Prior Publication Data

US 2009/0104891 A1    Apr. 23, 2009

Related U.S. Application Data

(63) Continuation of application No. PCT/CN2007/070168, filed on Jun. 22, 2007.

(30) Foreign Application Priority Data

Jun. 24, 2006  (CN) .......................... 2006 1 0061340

(51) Int. Cl.
*H04M 3/16*  (2006.01)
(52) U.S. Cl.
USPC ........................................ 455/411; 455/435.1
(58) Field of Classification Search
USPC .................. 455/411, 412.2, 433, 435.1, 440, 455/410
See application file for complete search history.

(56) References Cited

U.S. PATENT DOCUMENTS

| | | | |
|---|---|---|---|
| 6,957,060 B1 | 10/2005 | Sharp | |
| 7,281,137 B1 | 10/2007 | Vitikainen | |
| 2003/0120920 A1* | 6/2003 | Svensson | ...................... 713/168 |
| 2003/0191939 A1 | 10/2003 | Tsai et al. | |
| 2003/0210678 A1 | 11/2003 | Haukka et al. | |
| 2004/0003058 A1* | 1/2004 | Trossen | ........................ 709/220 |
| 2004/0219905 A1 | 11/2004 | Blumenthal et al. | |
| 2005/0083904 A1* | 4/2005 | Khartabil et al. | ............. 370/351 |

FOREIGN PATENT DOCUMENTS

| | | |
|---|---|---|
| CN | 1391758 A | 1/2003 |
| CN | 1700640 A | 11/2005 |
| CN | 1728639 A | 2/2006 |

(Continued)

OTHER PUBLICATIONS

International Search Report issued in corresponding PCT Application PCT/CN2007/070168; mailed Sep. 20, 2007.

(Continued)

*Primary Examiner* — Wesley Kim
*Assistant Examiner* — Dinh P Nguyen
(74) *Attorney, Agent, or Firm* — Brinks Hofer Gilson & Lione (57) ABSTRACT

An access method of network terminals, an access system and gateway are provided. In the access method of the present invention, providing an access proxy to the service network system for a network terminal initiating an access request but not configured with the subscriber certification information to the service network system by the use of subscriber certification information to a service network system configured on a network terminal. The access system of the present invention includes a digital gateway configured with a gateway multimedia service processing module. By sharing the subscriber certification information to the service network system configured on the network terminal connected to the digital gateway, the network terminal not configured with the subscriber certification information to the service network system can realize the access certification to the service network system.

9 Claims, 9 Drawing Sheets

(56) References Cited

FOREIGN PATENT DOCUMENTS

| CN | 101094061 A | 12/2007 |
|---|---|---|
| KR | 2001-0054331 A | 7/2011 |
| WO | 02/056620 A1 | 7/2002 |
| WO | 2004/091165 A1 | 10/2004 |
| WO | 2006/000624 A1 | 1/2006 |
| WO | 2006/045706 A1 | 5/2006 |

OTHER PUBLICATIONS

European Communication issued in corresponding European Patent Application No. 07721785.9, mailed Nov. 24, 2010.
Office Action issued in corresponding Chinese Patent Application No. 200610061340.0; issued Mar. 10, 2010.
International Preliminary Search Report issued in corresponding PCT Application No. PCT/CN2007/070168; issued Jan. 6, 2009.
Schuba, Marko et al. "Internet ID—Flexible Re-Use of Mobile Phone Authentication Security for Service Access." URL:http://www.ericcson.com/res/thecompany/docs/journal_conference-papers/service_layer/internet_id_nordsec.pdf. retrieved from the internet on Nov. 4, 2004.
Supplementary Search Report issued in corresponding European Patent Application No. 07 72 1785; issued Jul. 22, 2010.
Office Action issued in corresponding European Patent Application No. 07 721 785.9; issued Aug. 4, 2010.
Office Action issued in corresponding European Patent Application No. 07721785.9, mailed Mar. 14, 2011,.
"3rd Generation Partnership Project; Technical Specification Group Services and System Aspects; 3G Security; Access security for IP-based Services (Release 7)", 3GPP TS 33.203, V7.2.0, Jun. 2006.

* cited by examiner

FIG. 11

ACCESS METHOD OF NETWORK TERMINALS, ACCESS SYSTEM AND GATEWAY

CROSS REFERENCE TO RELATED APPLICATIONS

This application is a continuation of International Application No. PCT/CN2007/070168 filed on Jun. 22, 2007, which claims priority of the Chinese Patent Application No. 200610061340.0 filed Jun. 24, 2006 titled "Access Method of Network Terminals, Access System and Gateway Equipment", the entire contents of all of which are incorporated by reference.

FIELD

The present embodiments relate to communications technology, and more particularly to an access method of network terminals, an access system, and gateway.

BACKGROUND

Figure 1:
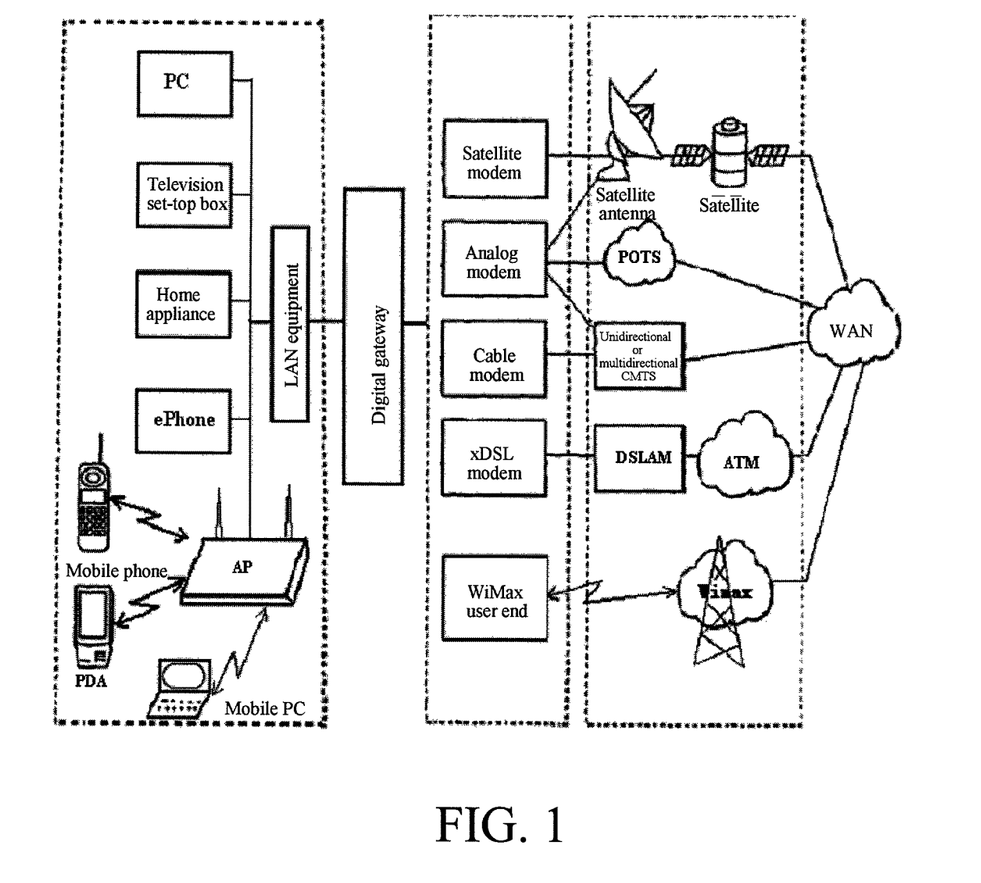
FIG. 1 is a schematic diagram showing multiple network terminals accessing a WAN through a gateway in a family or enterprise according to the prior art.

With the popularity of network terminals, more and more families and enterprises now have multiple network terminals. As shown in FIG. 1, through wired or wireless local area network (LAN) devices, network terminals of different forms and having different functions and characteristics are connected into a LAN, which is connected to a wide area network (WAN) through a digital gateway and communication devices. In this networking mode, each network terminal can access the WAN to implement the services such as webpage browsing and point-to-point communication.

An IP multimedia subsystem (IMS) is a subsystem of a multimedia service network, which is introduced by the 3GPP based on a packet bearer network and the trend of the convergence of the Internet and telecommunication networks. Considering the fixed to mobile convergence (FMC), subsystems of the multimedia service network, such as the IMS, are more frequently used to provide multimedia services to mobile terminals and fixed terminals.

The bearer of the IMS is an (Internet Protocol) IP network. The IMS can provide a complete set of solutions to IP multimedia services, which satisfy the requirements for security, charging, roaming, and quality of service (QoS) of multimedia services. The prototype of the IMS can be regarded as a platform for the IP multimedia services. In addition to the mobile network, the IMS is also applicable to the fixed network. The uniform structure provided by the IMS supports various IP-based services on the packet switched network and circuit switched network, which is irrespective of the access technology.

In the IMS, a network terminal, such as user equipment (UE) is configured with a universal mobile telecommunications system integrated circuit card (UICC) and/or an IMS subscriber identity module (ISIM). The UICC and/or ISIM card or module store the information about the identity certification of service subscribers related to the authentication. When a subscriber registers with the IMS network, the subscriber sends a registration request carrying subscriber information related to the authentication. After the IMS determines that the subscriber is legal through the subscriber information related to the authentication, the IMS provides multimedia services to the subscriber. When the network terminal needs the multimedia services provided by a subsystem of the multimedia service network, such as the IMS domain, the network terminal provides a function of access authentication to the subsystem domain of the multimedia service network. The gateway, for example, the gateway in FIG. 1, only provides a function for network terminals to access the WAN, but does not provide the function of access authentication function to the IMS domain. When the subscriber certification information to the IMS is not configured on a network terminal (for example, a fixed network terminal), the network terminal cannot pass the identity certification of the IMS, and thus cannot obtain the multimedia service provided by the IMS.

The gateway supporting the UICC is provided, in which the subscriber certification information on a UE can be shared by plugging the UICC or ISIM card of the UE having the UICC and/or ISIM into the gateway. However, the card should be plugged in and pulled out frequently in this solution, so it is inconvenient to use.

SUMMARY

The present embodiments may relate to an access system, an access method of network terminals, and gateway, which enable network terminals without subscriber certification information for a service network system to obtain services provided by the service network system.

In one embodiment, a method for a network terminal to access a service network system is provided. actA digital gateway receives an access request to the service network system initiated by a second network terminal connected to the digital gateway, in which subscriber certification information is not configured on the second network terminal. The digital gateway provides an access proxy to the service network system for the second network terminal initiating the access request by the use of the subscriber certification information configured on a first network terminal connected to the digital gateway, in which the subscriber certification information is configured on the first network terminal.

In one embodiment, a method for a network terminal to access a service network system is provided. actA network terminal configured with subscriber certification information receives an access request to the service network system initiated by a network terminal not configured with the subscriber certification information, in which the network terminal is connected to the network terminal configured with the subscriber certification information. The network terminal configured with the subscriber certification information provides an access proxy to the service network system for the network terminal initiating the access request by the use of the subscriber certification information.

In another embodiment, a method for a network terminal to access a service network system is provided. act The network terminal initiates an access request to the service network, in which subscriber certification information is not configured on the network terminal. The network terminal completes access certification to the service network system by the use of the subscriber certification information configured on other network terminals connected to the network terminal.

In another embodiment, gateway includes a gateway multimedia service processing module. The gateway multimedia service processing module is adapted to receive an access request to a service network system initiated by a second network terminal, and provide an access proxy to the service network system for the second network terminal initiating the access request by the use of subscriber certification information configured on a first network terminal. The first and the second network terminals are connected to the gateway, and the subscriber certification information is configured on the first network terminal, but is not configured on the second network terminal.

In one embodiment, an access system includes a gateway. The gateway includes a gateway multimedia service processing module.

The gateway multimedia service processing module is adapted to receive an access request to a service network system initiated by a second network terminal, and provide an access proxy to the service network system for the network terminal initiating the access request by the use of subscriber certification information configured on a first network terminal. The first and the second network terminals are connected to the gateway, and the subscriber certification information is configured on the first network terminal, but is not configured on the second network terminal.

In one embodiment, an access system includes a plurality of network terminals and a connecting device adapted to connect the plurality of network terminals.

The plurality of network terminals includes at least one network terminal configured with the subscriber certification information, and the network terminal includes a terminal multimedia service proxy module.

The terminal multimedia service proxy module is adapted to receive access requests to a service network system initiated by the network terminals not configured with the subscriber certification information, and provide an access proxy to the service network system for the network terminals initiating the access requests by the use of the subscriber certification information on the network terminal.

The access method of network terminals and the access system share the subscriber certification information to the service network system configured on the first network terminal in the system, and provide the access proxy to the service network system for the second network terminal initiating the access request but not configured with the subscriber certification information to the service network system in the system by the use of the digital gateway. The access certification to the service network system of the second network terminal is implemented, and the access certification of all network terminals in the system to the service network system, such as the multimedia service network subsystem IMS, is realized, so that the network terminals can obtain the services such as the multimedia services provided by the service network system.

The access method of network terminals and the access system share the subscriber certification information to the service network system configured on the first network terminal in the system, and provide the access proxy to the service network system for the second network terminal initiating the access request but not configured with the subscriber certification information to the service network system in the system by the use of a third network terminal configured with the subscriber certification information to the service network system in the system. The access certification to the service network system of the second network terminal is implemented, and the access certification of all network terminals in the system to the service network system, such as the multimedia service network subsystem IMS, is realized, so that the network terminals can obtain the services such as the multimedia services provided by the service network system.

The gateway uses the gateway multimedia service processing module configured on the gateway equipment, so that all of the network terminals connected to the gateway equipment can share the subscriber certification information configured on the network terminal connected to the gateway equipment and configured with the subscriber certification information to the service network system. The gateway completes the access certification to the service network system for the second network terminal not configured with the subscriber certification information to the service network system by the use of the subscriber certification information. The access certification of all network terminals in the system to the service network system, such as the multimedia service network subsystem IMS, is realized, so that the network terminals can obtain the services such as the multimedia services provided by the service network system.

DETAILED DESCRIPTION

The access system, access method of network terminals, and digital gateway according to the present embodiments use a network terminal configured with subscriber certification information, so as to implement the access certification to a service network system of the network terminals not configured with the subscriber certification information. The service network system includes a multimedia service network subsystem, such as the IMS.

Figure 2:
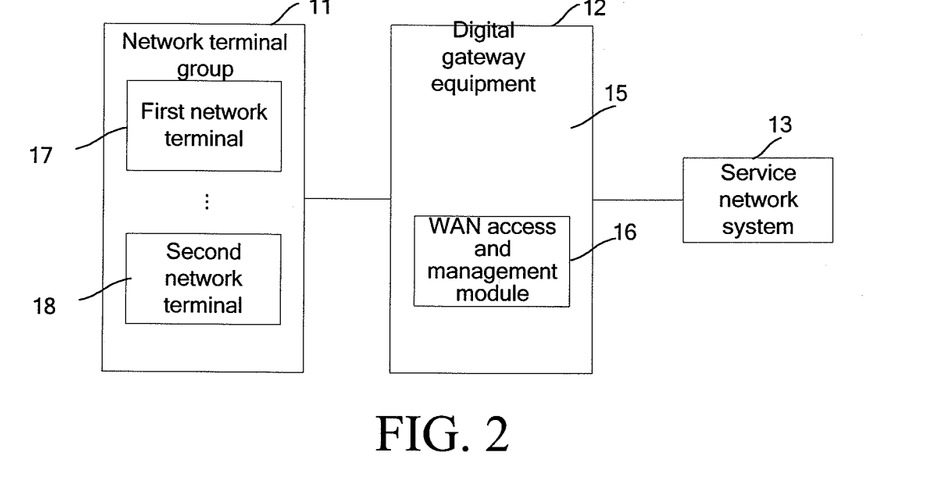
FIG. 2 illustrates one embodiment of an access system of network terminals.

FIG. 2 is a basic structural diagram of an access system according to an embodiment of the present invention. As shown in FIG. 2, the access system according to an embodiment of the present invention includes a network terminal group 11, a digital gateway 12, and a service network system 13. Network terminals in the network terminal group 11 are connected into a local area network (LAN) through connecting devices such as LAN devices, and the LAN is connected to the digital gateway 12. The digital gateway 12 receives access and/or service request sent by the network terminal in the network terminal group 11, and responds to the request. Thus, the network terminal completes the access certification to the service network system 13, and obtains the services provided by the service network system 13.

The network terminal group 11 at least includes a first network terminal 17 and a second network terminal 18. The first network terminal 17 is configured with the subscriber certification information to the service network system, for example, the first network terminal 17 is a mobile terminal supporting UMTS integrated circuit card (UICC) and/or IMS subscriber identity module (ISIM). The second network terminal 18 is not configured with the subscriber certification information to the service network system, for example, the second network terminal 18 is a fixed terminal not supporting the UICC and/or ISIM, such as a PC or television set-top box.

The digital gateway 12 includes a gateway multimedia service proxy module 15 and a wide area network (WAN) access and management module 16. The gateway multimedia service proxy module 15 provides an access proxy to the service network system 13 for other network terminals connected to the module, especially the second network terminal 18, by the use of the subscriber certification information configured on the first network terminal 17. The WAN access and management module 16 is a functional module of the existing digital gateway 12. The module is adapted to realize the access and management functions from the gateway to the WAN. The WAN access function of the gateway realizes the connection from a digital home network to a public network. Currently, many modes are available for realizing the access to the public network, such as the ADSL, Ethernet, TV cables, and power lines. The WAN management function of the gateway includes address resolution, packet forwarding, quality of service (QoS), DHCP, and firewall. The prior art has provided many solutions for WAN access and management functions, which are not the focus of the present invention, and will not be described in detail here.

The service network system 13 according to an embodiment of the present invention can be a multimedia service network subsystem, such as the IMS. The digital gateway 12 can access the multimedia service network subsystem such as the IMS through a UICC authentication mode or a non-UICC authentication mode, for example, through client software. Thus, the digital gateway 12 provides an access proxy function to the service network system for the network terminals connected to the digital gateway, so that the network terminals connected to the digital gateway share the subscriber certification information to the service network system and share the service capabilities, so as to obtain the services provided by the service network system. For a network terminal supporting the access authentication and certification function to the service network system, such as the first network terminal, optionally, the digital gateway and system can provide only the access capability to a metropolitan area network (MAN) according to the configuration policies, and does not provide the access proxy function to the service network system. Thus, the network terminal can perform the access authentication and certification to the service network system as a subscriber itself.

Figure 3:
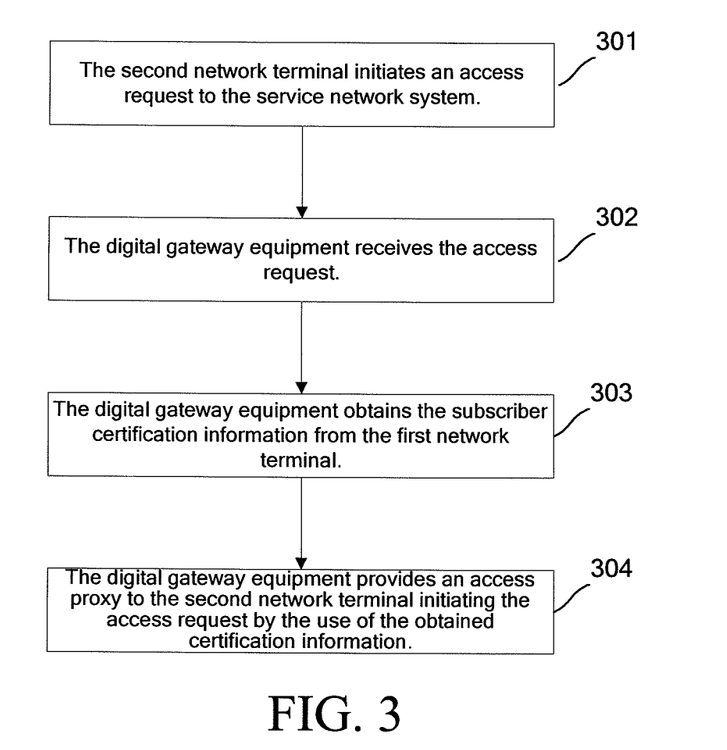
FIG. 3 is a flow chart of one embodiment of a method for initiating a registration request to a service network system in the access system.

FIG. 3 shows the access system according to an embodiment together with FIG. 2. The process that the second network terminal 18 initiates the access request to the service network system and completes the access certification includes the following acts.

In Act 301, the second network terminal initiates an access request to the service network system to the digital gateway.

In Act 302, the digital gateway receives the initiated access request.

In Act 303, the digital gateway obtains the subscriber certification information configured on the first network terminal from the first network terminal.

In one example of Act 303, the digital gateway obtains the subscriber certification information from the first network terminal in real time, for example, obtains the subscriber certification information stored in the UICC and/or ISIM card or module from the network terminal supporting the UICC/ISIM. The subscriber certification information can be, but not limited to, reported to the gateway automatically upon the establishment of the connection between the first network terminal and the digital gateway, or the gateway actively queries the subscriber certification information configured on the connected first network terminal, and then the digital gateway stores the information and updates it in real time. In the Act 303, the digital gateway can obtain the service capability information about the first network terminal from the first network terminal in real time with the same method.

In one example, when a plurality of network terminals is connected to the digital gateway, the digital gateway can obtain multiple pieces of subscriber certification information in this act. At this time, according to the service capability requirements in the initiated access request, the digital gateway can select the subscriber certification information meeting the service capability requirements from the multiple pieces of subscriber certification information.

Optionally, in the Act 303, when the digital gateway needs to obtain the subscriber certification information from the first network terminal, the digital gateway negotiates with the first network terminal, and can obtain the subscriber certification information only after the network terminal authorizes the digital gateway to use the information.

In Act 304, the digital gateway performs the access certification to the service network system by the use of the obtained subscriber certification information, and provides the access proxy to the service network system for the second network terminal initiating the access request.

In one example, when the digital gateway provides the access proxy to the service network system, for example, the IMS, for the second network terminal, the operations of the UICC and/or ISIM card or module are needed, e.g. encryption of some data. At this time, the gateway sends the data to be processed during the certification of the service network system, for example, the IMS network, to the equipment having the UICC and/or ISIM card or module, and requests relevant processing. After the terminal completes processing the data, the processed data is sent to the gateway, so that the gateway completes the certification to the IMS network.

Figure 4:
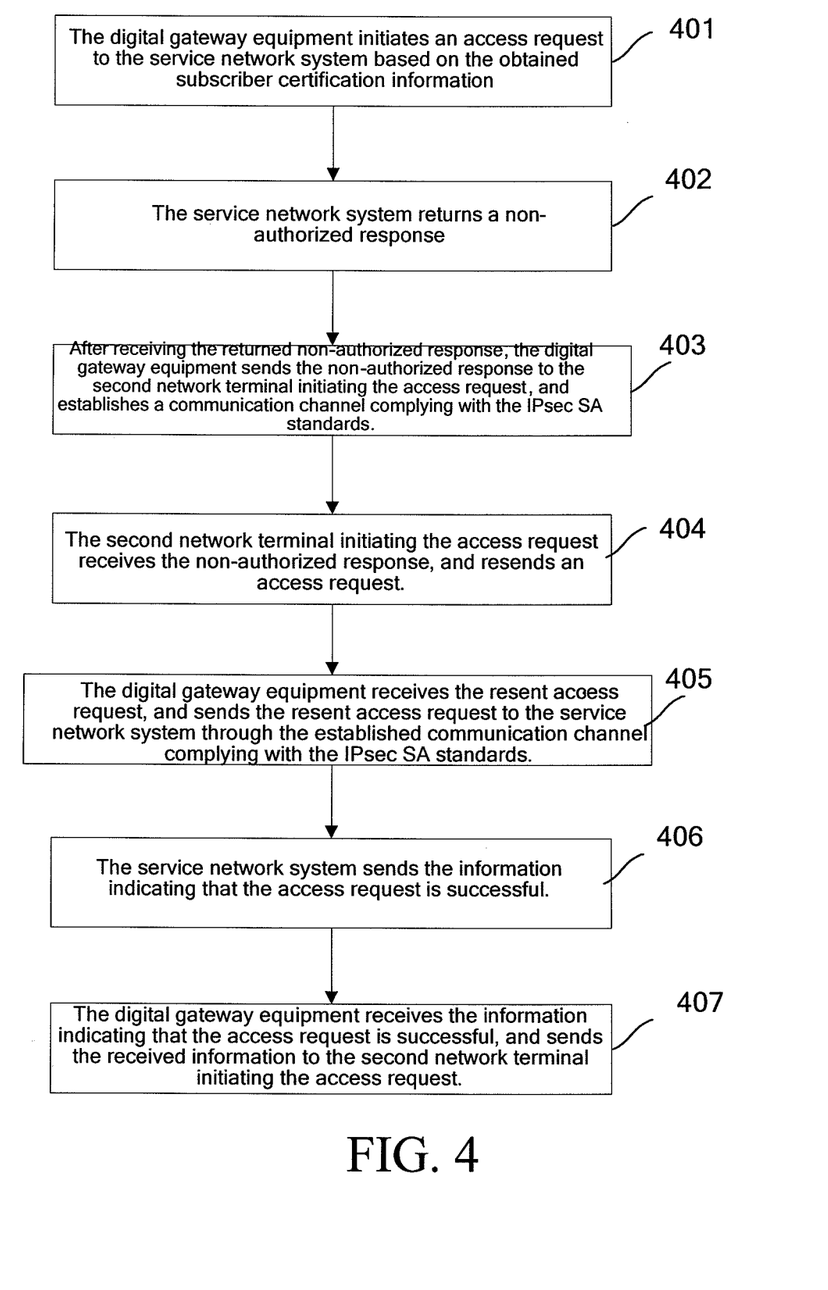
FIG. 4 is a flow chart of one embodiment of a method for accessing certification to the service network system in the access system by the use of the obtained subscriber certification information.

Referring to FIGS. 3 and 4, the process that the digital gateway performs the access certification to the service network system by the use of the obtained subscriber certification information includes the following acts.

In Act 401, the digital gateway initiates an access request to the service network system based on the obtained subscriber certification information.

In Act 402, the service network system returns a non-authorized response to the digital gateway.

In Act 403, after receiving the non-authorized response returned by the service network system, the digital gateway sends the non-authorized response to the second network terminal initiating the access request, and establishes a communication channel complying with the IPsec security association (SA) standards between the digital gateway and the service network system.

In Act 404, the second network terminal initiating the access request receives the non-authorized response, and resends an access request to the service network system.

In Act 405, the digital gateway receives the access request resent by the network terminal, and sends the resent access request to the service network system through the established communication channel complying with the IPsec SA standards.

In Act 406, according to the authentication subscriber information configured on the service network system and the subscriber certification information contained in the access request sent by the digital gateway through the IPsec communication channel, the service network system determines that the digital gateway is a legal subscriber, and sends the information indicating that the access request is successful to the digital gateway.

In Act 407, the digital gateway receives the message indicating that the access request is successful, and sends the received message indicating that the access request is successful to the network terminal sending the access request. The access certification of the network terminal initiating the access request to the service network system is completed.

Figure 5:
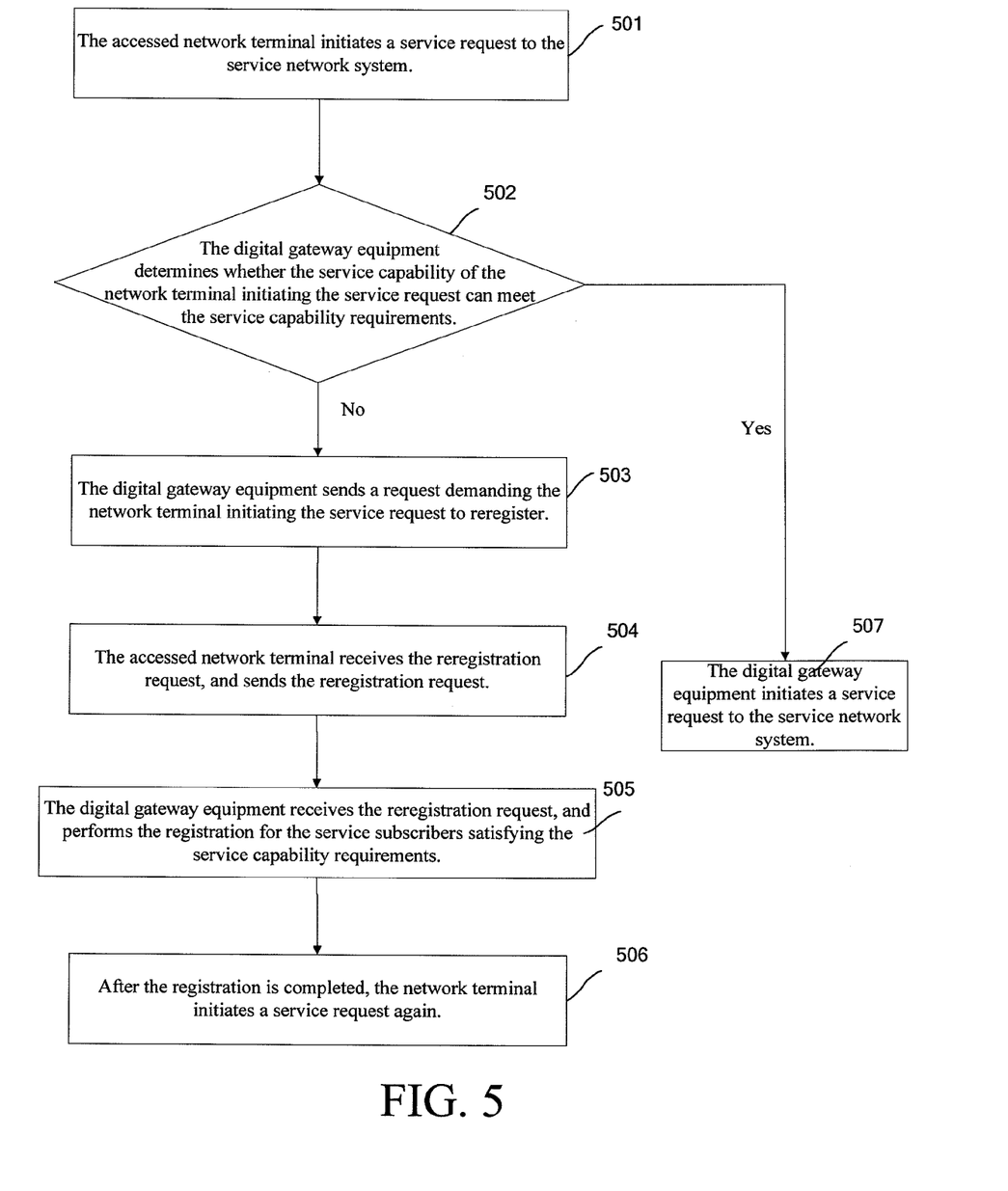
FIG. 5 is a flow chart of one embodiment of a method for initiating a service request to the service network system in the access system.

After the second network terminal in the network terminal group uses the previous or other existing methods to access the service network system, if the second network terminal needs to obtain the service provided by the service network system, such as the multimedia service provided by the IMS, the second network terminal must further send a service request to the service network system. FIG. 5 shows the process that the second network terminal that has accessed the service network system and needs to obtain the service provided by the service network system initiates a service request to the service network system for obtaining the service provided by the service network system in the access system according to an embodiment of the present invention. The process includes the following acts.

In Act 501, the accessed network terminal initiates a service request to the service network system.

In Act 502, the digital gateway receives the service request, and determines whether the service capability of the accessed network terminal initiating the service request can meet the service capability requirements for the service request; if the service capability of the accessed network terminal initiating the service request can meet the service capability requirements for the service request, the process proceeds to Act 507; otherwise, the process proceeds to Act 503.

In Act 503, the digital gateway sends a request demanding the network terminal initiating the service request to reregister, and the process proceeds to Act 504;

In Act 504, the accessed network terminal receives the request for re-registration, and initiates the re-registration request to the digital gateway;

In Act 505, the digital gateway receives the re-registration request, and performs the registration for the subscriber satisfying the service capability requirements in the first network terminal connected to the digital gateway according to the service capability requirements in the re-registration request;

In Act 506, after the registration is completed, the network terminal initiates a service request again, and the service network system processes the service request, and provides service to the UE initiating the service request according to the existing service request processing process. The process ends.

In Act 507, the digital gateway initiates a service request to the service network system, and the service network system processes the service request, and provides service to the UE initiating the service request according to the existing service request processing process. The process ends.

Acts 507-509 of FIG. 5 are not only applicable to the situation that the accessed second network terminal initiates the service request to the service network system, but also applicable to the situation that the accessed first network terminal initiates the service request to the service network system. The difference between the two situations is that in Act 505, after receiving the re-registration request, according to the service capability requirements in the re-registration request, the digital gateway performs the registration for the subscribers meeting the service capability requirements in the network terminals connected to the digital gateway and configured with the subscriber registration information to the service network system, other than the first network initiating the service request.

Figure 6:
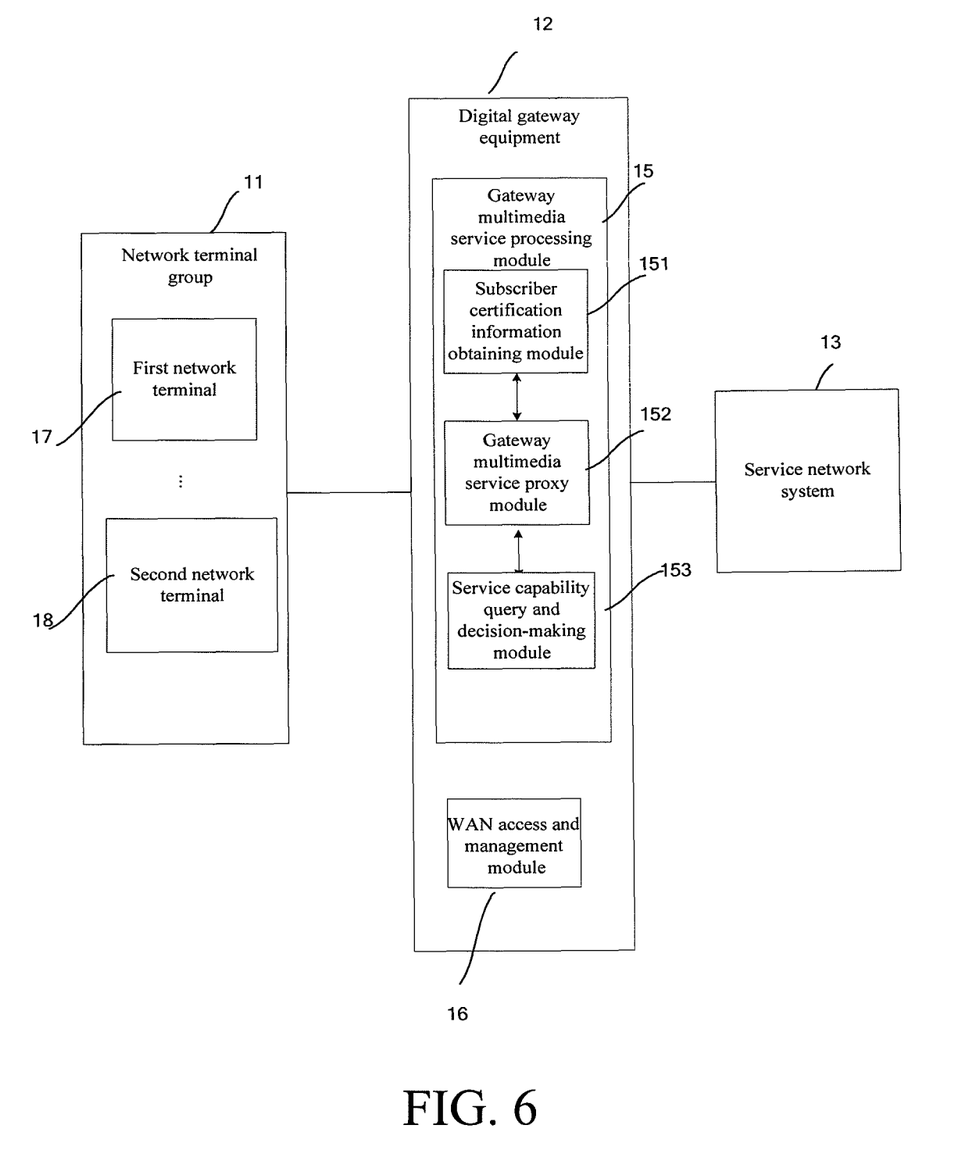
FIG. 6 illustrates one embodiment of an access system.

FIG. 6 is a schematic structural diagram of a detailed implementation of the access system according to one embodiment. As shown in FIG. 6, in the detailed implementation, the gateway multimedia service processing module 15 includes a subscriber certification information obtaining module 151 and a gateway multimedia service proxy module 152. The subscriber certification information obtaining module 151 is adapted to obtain the subscriber certification information in the first network terminal 17 in real time, and obtain the service capability information when the service capability information is required. The gateway multimedia service proxy module 152 is adapted to provide an access proxy to the service network system for the second network terminal 18 according to the subscriber certification information obtained by the subscriber certification information obtaining module 151, so as to complete the access certification to the service network system for the second network terminal 18.

The subscriber certification information obtaining module can obtain the subscriber certification information and/or the service capability supported by the subscriber with the following two methods.

In a first method, after the network terminal is connected to the digital gateway, the network terminal automatically reports the subscriber certification information and/or the supported service capabilities to the digital gateway equipment, and the digital gateway equipment obtains and stores the information, and updates it in real time.

In a second method, the digital gateway actively queries the subscriber certification information and/or the supported service capabilities of the network terminal 17, so as to obtain and store the subscriber certification information and/or the service capabilities in real time, and update the information in real time.

In one example, the gateway multimedia service processing module 15 further includes a service capability query and decision-making module 153, which realizes the following functions.

The service capability query and decision-making module 153 responds to the request for querying the subscriber certification information and/or service capabilities sent by the gateway multimedia service proxy module 152, sends the query request to the subscriber certification information obtaining module 151, and returns the query results obtained by the subscriber certification information obtaining module 151 to the gateway multimedia service proxy module 152;

The service capability query and decision-making module 153 further selects among multiple pieces of subscriber certification information according to preset standards based on the service request requirements in the current access request, for example, selects the subscriber certification information meeting the current service capability requirements, and provides the selected subscriber certification information to the gateway multimedia service proxy module 152.

In one example, in order to complete the access certification of the second network terminal 18 to the service network system, the gateway multimedia service processing module 15 further includes, but is not limited to, a registration request receiving module, a subscriber information query request sending module, an access request initiating module, a non-authorized response receiving and channel establishing module, a re-access request receiving and sending module, an access request success determining module, a service request receiving module, and a service capability determining module.

The registration request receiving module is adapted to receive a registration request to the service network system, for example, to the multimedia service network system, such as the IMS initiated by the second network terminal 18.

The subscriber information query request sending module is adapted to send a subscriber information query request to the service capability query and decision-making module based on the service capability request information of a network terminal.

The access request initiating module is adapted to initiate a registration request to a service network subsystem after receiving the subscriber information selected by the service capability query and decision-making module.

The non-authorized response receiving and channel establishing module is adapted to receive a non-authorized response and feedback the response to the network terminal, such as UE sending the registration request when the service network subsystem returns the non-authorized response, and establish a communication channel complying with the IPsec SA standards between the digital gateway and the service network system. The IPsec is a series of open IP security standards formulated by the IETF based on the IP network (including the Intranet, Extranet, and Internet), and the IPsec aims to provide secure communication connections between Internet communication nodes. The IPsec SA establishes the communication connections complying with the security standards of the IPsec SA, and the subsequent information exchange uses the established communication modes complying with the security standards.

The re-access request receiving and sending module is adapted to receive an access request initiated again by the network terminal initiating the access request but receiving the non-authorized response, and send the access request initiated again to the service network system through the communication channel established by the communication channel establishing module.

The access request success determining module is adapted to send the access request success information to the digital gateway, when the digital gateway is determined as a legal subscriber, according to the authentication subscriber information configured on the service network system and the subscriber certification information contained in the access request sent through the IPsec communication channel by the digital gateway.

The service request receiving module is adapted to receive the service request sent by a registered network terminal, such as UE.

The service capability determining module is adapted to send a service capability requirements query request to the service capability query and decision-making module based on the service capability requirements of a network terminal, and determine whether the service capability of a registered subscriber meets the requirements for the current service request capability after receiving the information indicating that the requirements for the current service request capability are met sent by the service capability query and decision-making module. If yes, the service capability determining module initiates a service request to the service network subsystem; otherwise, the service capability determining module sends a re-registration request to the network terminal, such as UE sending the service request, so that the digital gateway selects a subscriber satisfying the service capability requirements of the current service request again.

In one exemplary embodiment, in the access system, multiple network terminals can be connected into a LAN through LAN devices and the LAN can be connected to the service network system through the digital gateway. The network terminals can be connected to the LAN devices directly or through access points (APs) to form the LAN. The LAN formed by the network terminals and the LAN devices is connected to the service network system, for example the multimedia service network subsystem such as the IP multimedia subsystem (IMS), through the digital gateway and communication devices.

Figure 7:
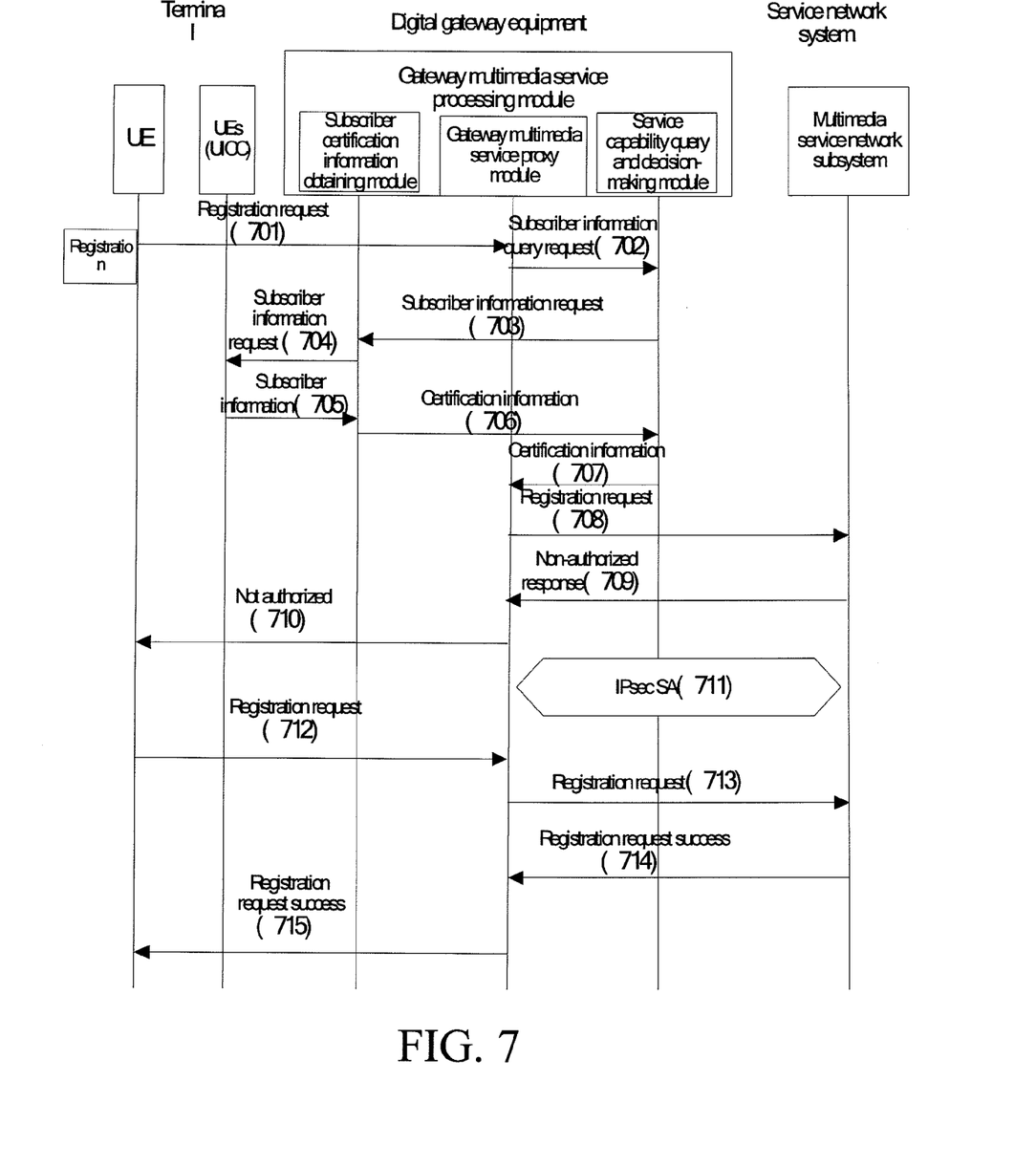
FIG. 7 is a flow chart of one embodiment of a method for sending a registration request to the service network system in the access system of FIG. 6.

FIG. 7 shows the process that the second network terminal 18 sends a registration request to the service network system 13 in the access system of FIG. 6. The multimedia service network subsystem is taken as an example. The process includes the following acts.

In Act 701, the second network terminal, such as UE initiates a registration request with the service network system to the digital gateway.

In Act 702, the digital gateway uses the gateway multimedia service proxy module to receive the registration request with the service network subsystem domain sent by the second network terminal, such as UE, and sends a subscriber information query request to the service capability query and decision-making module based on the service capability request information of the network terminal.

In Acts 703-706, the service capability query and decision-making module sends a subscriber information request to the subscriber certification information obtaining module, obtains the subscriber certification information in the first network terminal 17 currently connected to the digital gateway, for example, in the network terminals (UEs) supporting the UICC and/or ISIM through the subscriber certification information obtaining module, and selects among the subscribers based on the service capability requirements in the current registration request.

In Acts 707-708, the service capability query and decision-making module provides the information about the selected subscribers to the gateway multimedia service proxy module. The gateway multimedia service proxy module initiates a registration request based on the information about the selected subscribers.

In Acts 709-711, the service network system, for example, the IMS returns a non-authorized response to the gateway multimedia service proxy module, and after receiving the non-authorized response, the gateway multimedia service proxy module establishes a communication channel complying with IPsec SA standards, and feeds back the non-authorized response to the second network terminal, such as UE sending the registration request.

In Acts 712-713, after receiving the non-authorized response, the second network terminal, such as UE sending the registration request initiates a registration request to the multimedia service proxy module again, and the gateway multimedia service proxy module sends the registration request to the service network subsystem through the established communication channel.

In Acts 714-715, the service network subsystem returns a registration request success message to the gateway multimedia service proxy module, and the gateway multimedia service proxy module sends the returned registration request success message to the network terminal initiating the registration request, so as to complete the registration.

Figure 8:
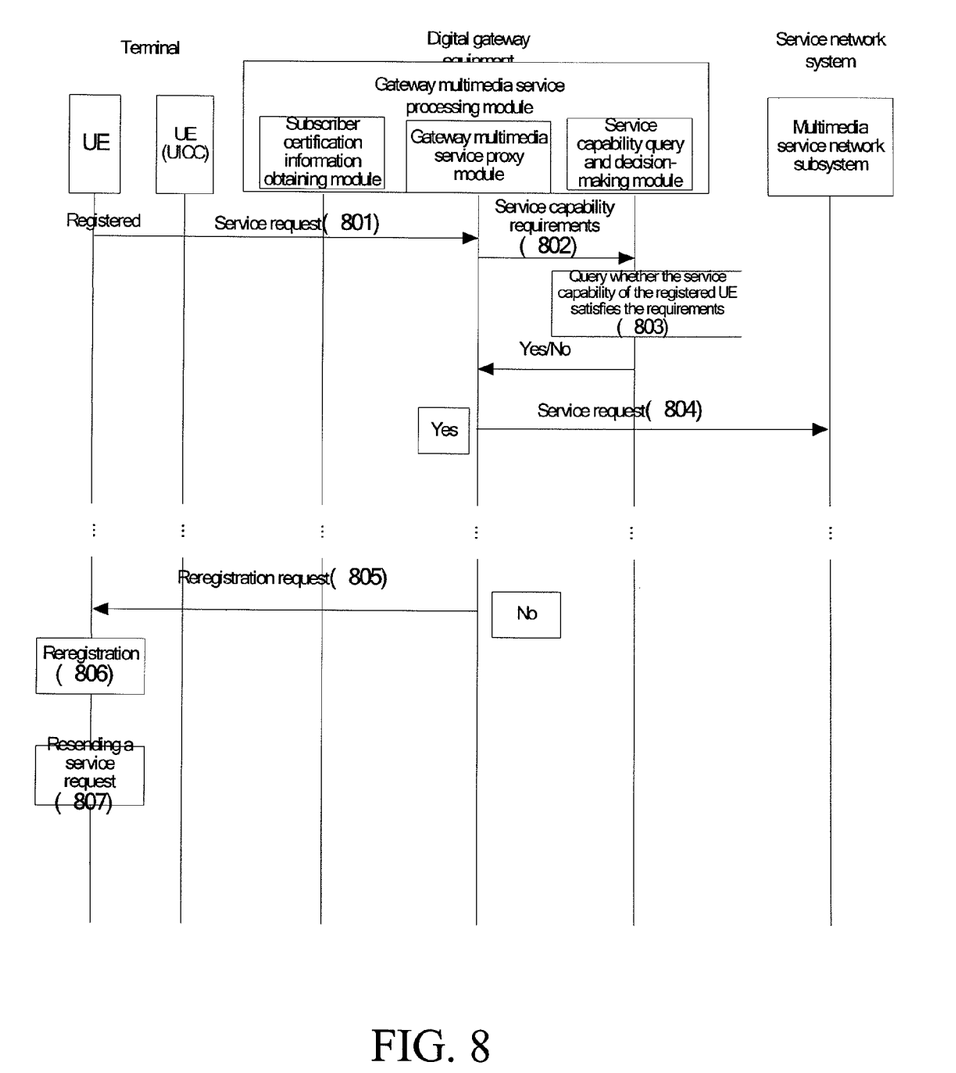
FIG. 8 is a flow chart of one embodiment of a method for initiating a service request to the service network system in the access system of FIG. 6.

FIG. 8 shows the process that the network terminal that needs to obtain the service provided by the service network system and has registered with the service network system initiates a service request to the service network system. The process includes the following acts.

In Acts 801-802, the registered network terminal initiates a service request to the gateway multimedia service proxy module, and the gateway multimedia service proxy module sends a service capability requirements query request to the service capability query and decision-making module based on the service capability requirements of the network terminal.

In Act 803, the service capability query and decision-making module checks whether the service capability of the registered network terminal initiating the service request satisfies the requirements of the service request, and notifies the gateway multimedia service proxy module. If the service capability of the registered network terminal satisfies the capability requirements of the current service request, the process proceeds to Act 804; otherwise, the process proceeds to Act 805.

In Act 804, the gateway multimedia service proxy module further sends a service request to the service network system, and the service network system processes the service request. The gateway multimedia service proxy module further provides service to the UE initiating the service request according to the existing process for processing the service request, and the process ends.

In Act 805, the gateway multimedia service proxy module sends a re-registration request to the registered network terminal, such as UE sending the service request.

In Acts 806-807, the network terminal UE sends the re-registration request, and the service capability query and decision-making module performs the registration for the subscriber meeting the service capability requirements. After the registration, the network terminal UE initiates a service request again, and the service network system processes the service request, and further provides service to the UE initiating the service request according to the existing process for processing the service request, and the process ends. Details of the registration are similar to the registration process of FIG. 7, and will not be described again here.

Figure 9:
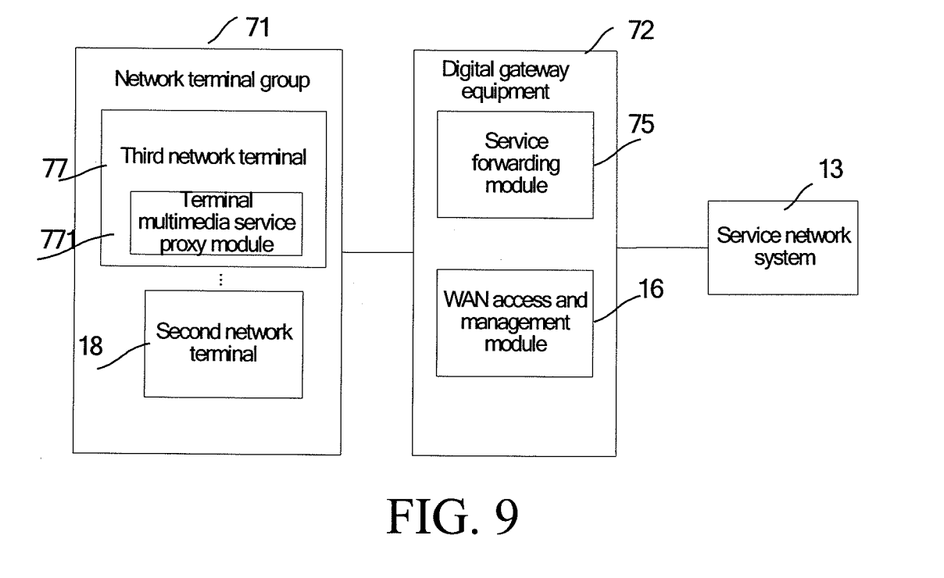
FIG. 9 illustrates one embodiment of an access system.

In one embodiment, as shown in FIG. 9, an access system of network terminals includes a network terminal group 71, a digital gateway 72, and a service network system 13, for example, a multimedia service network subsystem such as the IMS. In one example, the network terminals in the network terminal group 71 are connected into a LAN, and the LAN is then connected to the digital gateway 72. The network terminal group 71 includes at least a third network terminal 77 and the second network terminal 18. The third network terminal 77 is connected to the digital gateway, and the subscriber certification information to the service network system and a terminal multimedia service proxy module 771 are configured on the third network terminal 77. The second network terminal 18 is connected to the digital gateway, and the subscriber certification information is not configured on the second network terminal 18. The terminal multimedia service proxy module 771 provides the access proxy to the service network system 13 for the second network terminal 18 by the use of the subscriber certification information configured on the third network terminal 77. The third network terminal 77 having the access proxy function to the service network system can access the service network system in a UICC authentication or non-UICC authentication mode. The digital gateway 72 includes a request forwarding module 75 adapted to forward the access and/or service requests initiated by the second network terminal 18 to the third network terminal 77, and includes a WAN access and management module 16 (the functions of this module are the same as those previously described, and will not be described again here). In one exemplary embodiment, in addition to the request forwarding, WAN access and management functions, the digital gateway 72 also provides, but not limited to, a function of MAN access to the third network terminal 77, that is, a bridging function, which is an existing function of the digital gateway, and thus will not be described again here. The third network terminal 77 can access the service network system through the MAN access function provided by the digital gateway 72, and completes the message and service flow exchange with the service network system.

Figure 10:
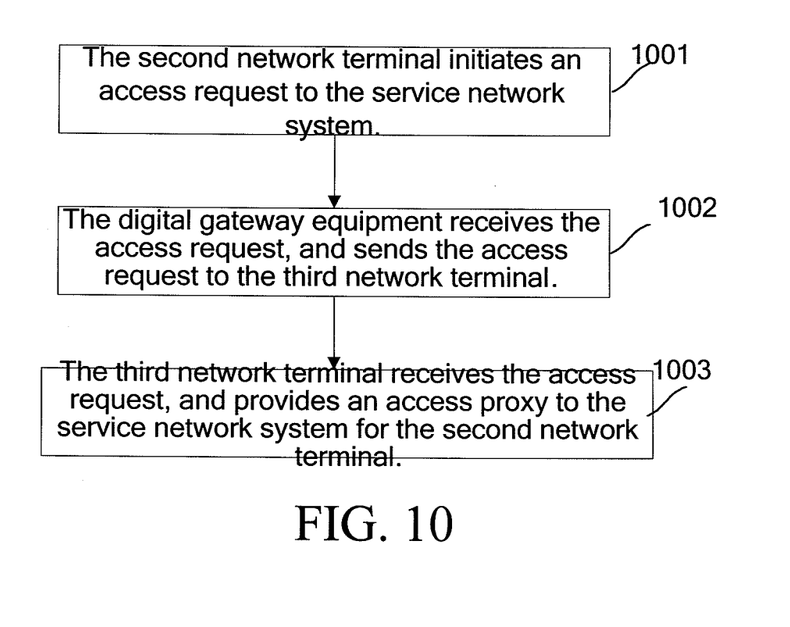
FIG. 10 is a flow chart of one embodiment of an access method for network terminals to access a service network system.

FIG. 10 shows the basic process that the second network terminal 18 initiates the access request to the service network system in the access system according to another embodiment of the present invention. Referring to FIGS. 9 and 10, the process includes the following acts.

In Act 1001, the second network terminal initiates an access request to the service network system to the digital gateway.

In Act 1002, the digital gateway receives the access request initiated by the second network terminal, and sends the access request to the third network terminal.

In Act 1003, the third network terminal receives the access request sent by the digital gateway, and performs the access certification to the service network system by the use of the subscriber certification information configured on the third network terminal, so as to provide an access proxy to the service network system to the second network terminal sending the access request.

In the Act 1003, the third network terminal providing the access proxy to the service network system for the second network terminal sending the access request includes the following processes. The third network terminal initiates the access request to the service network system by the use of the subscriber certification information configured on it to replace the second network terminal, so as to perform the message exchange during the access certification with the service network system, and forwards the relevant messages to the second network terminal until the access certification to the service network system of the second network terminal completes.

Figure 11:
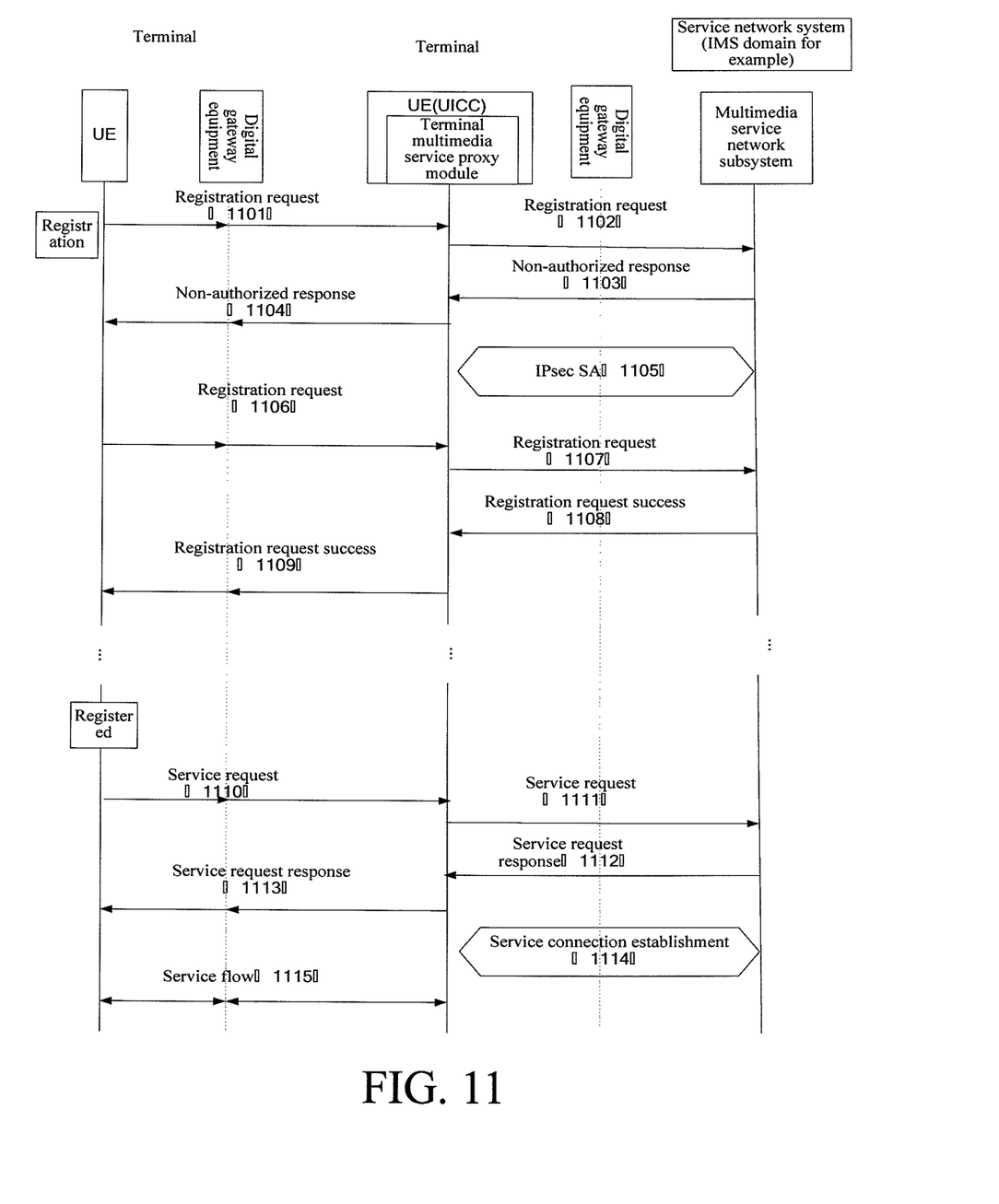
FIG. 11 is a flow chart of one embodiment of a method for registering and obtaining service after the registration in the access system.

FIG. 11 shows the process that the second network terminal initiates the registration with the service network system, and obtains the service provided by the service network system after the registration in the access system according to another embodiment of the present invention. Referring to FIGS. 9 and 11, the process includes the following acts. Here, exemplarily, the third network terminal accesses the service network system through the MAN access function provided by the digital gateway, and completes the message and service flow exchange with the service network system through the digital gateway.

In Act 1101, the second network terminal UE initiates an access request to the service network system, and the digital gateway sends the access request to the third network terminal, for example, the UE that supports the UICC and/or ISIM.

In Act 1102, the third network terminal uses the terminal multimedia service processing module configured on it to receive the forwarded registration request, and sends a registration request to the service network system based on the subscriber certification information configured on the third network terminal.

In Acts 1103-1105, after the third network terminal uses the terminal multimedia service processing module to receive the non-authorized response returned by the service network system, a communication channel complying with the IPsec SA standards is established between the digital gateway and the service network system, and the non-authorized response is sent to the second network terminal UE initiating the registration request through the digital gateway.

In Act 1106, after receiving the non-authorized response, the second network terminal UE initiating the access request sends a registration request to the service network system again, and the registration request is forwarded to the third network terminal through the digital gateway.

In Acts 1107-1109, the terminal multimedia service processing module sends the registration request to the service network system through the established IPsec communication channel. When the service network system determines that the third network terminal is a legal subscriber according to the authentication subscriber information configured on it and the subscriber certification information contained in the registration request sent by the terminal multimedia service processing module through the IPsec communication channel, the service network system sends a registration request success message to the third network terminal. The third network terminal receives the registration request success message, and forwards the message to the second network terminal UE to complete the registration with the service network system.

After the network terminals are registered with the service network system, if the network terminals need further to obtain the service provided by the service network system, the network terminals send the service request. Acts 1110-1115 describe the process that the network terminals registered with the service network system obtain the service provided by the service network system in the access system according to another embodiment of the present invention.

In Acts 1110-1111, a registered network terminal initiates a service request to the digital gateway, which forwards the service request to the terminal multimedia service proxy module, and the terminal multimedia service proxy module sends the service request to the service network system.

In Acts 1112-1115, after receiving a response to the service request returned by the service network system, the terminal multimedia service proxy module sends the response to the service request to the registered UE initiating the service request, and establishes a service connection between the third network terminal and the service network system to send the service flow to the UE initiating the service request.

In one embodiment, the connecting device serving as the media for the message and service flow exchange between the second and third network terminals is not limited to the digital gateway. Instead, the connecting device can be other equipment having similar connecting and forwarding functions, such as the switch equipment. For example, when the connecting device is the switch equipment, the messages and services between the second and third network terminals can be forwarded by the switch equipment, and the third network terminal can still access the service network system through the MAN access function provided by the digital gateway, but the present invention is not limited to this.

It will be apparent to those skilled in the art that various modifications and variations can be made to the structure of the present invention without departing from the scope or spirit of the invention. In view of the foregoing, it is intended that the present invention cover modifications and variations of this invention provided that they fall within the scope of the following claims and their equivalents.

What is claimed is:

1. A method for network terminals to access a service network system, comprising:
   receiving, by a digital gateway equipment, an access request to the service network system initiated by a second network terminal, wherein the second network terminal is not configured with subscriber certification information; and
   providing, by the digital gateway equipment, an access proxy to the service network system for the second network terminal by the use of the subscriber certification information configured on a first network terminal,
   wherein after the second network terminal initiating the access request completes the access certification by the use of the access proxy, the method further comprises:
   receiving, by the digital gateway equipment, a service request to the service network system initiated by the accessed network terminal;
   determining, by the digital gateway equipment, whether a service capability of the accessed subscriber initiating the service request meets service capability requirements of the service request; wherein if yes, the digital gateway equipment sends the service request to the service network system; otherwise, the digital gateway equipment requests the second network terminal initiating the service request to reregister, and performs registration for a subscriber meeting the service capability requirements according to the service capability requirements in a re-registration request sent by the second network terminal and the subscriber certification information configured on the first network terminal.

2. A gateway equipment, comprising:
   a gateway multimedia service processing module having at least a processor, configured to receive an access request to a service network system initiated by a second network terminal, and provide an access proxy to the service network system for the second network terminal by the use of subscriber certification information configured on a first network terminal;
   wherein the first network terminal and the second network terminal are connected to the gateway equipment, and the second network terminal is not configured with the subscriber certification information;
   wherein the gateway multimedia service processing module further comprises:
   a service request processing module, configured to receive a service request to the service network system initiated by the second network terminal that needs to obtain service provided by the service network system and has accessed the service network system;
   a service capability determining module, configured to determine whether a service capability of the accessed subscriber initiating the service request meets service capability requirements of the service request; wherein if yes, the service request processing module sends the service request to the service network system; otherwise, the service request processing module sends a re-registration request to the network terminal initiating the service request;
   a subscriber selecting module, configured to perform registration for a subscriber meeting the service capability requirements according to the service capability requirements in the re-registration request and the subscriber certification information configured on the first network terminal after receiving the re-registration request initiated by the second network terminal.

3. The method according to claim 1, wherein the digital gateway equipment completes access certification to the service network system by the use of the subscriber certification information configured on the first network terminal.

4. The method according to claim 1, wherein the digital gateway equipment negotiates with the first network terminal, and obtains an authority for using the subscriber certification information configured on the first network terminal.

5. The method according to claim 1, wherein after the digital gateway equipment receives the access request, the digital gateway equipment further obtains the subscriber certification information from the first network terminal.

6. The method according to claim 5, wherein the obtaining, by the digital gateway equipment, the subscriber certification information further comprises:
reporting, by the first network terminal, the subscriber certification information on the first network terminal to the digital gateway equipment; or
querying and storing, by the digital gateway equipment, the subscriber certification information configured on the first network terminal.

7. The method according to claim 5, wherein when the digital gateway equipment obtains more than one piece of subscriber certification information, the digital gateway equipment selects service subscriber certification information meeting service capability requirements from the more than one piece of subscriber certification information according to the service capability requirements in the received access request.

8. The gateway equipment according to claim 2, wherein the gateway multimedia service processing module further comprises:
a subscriber certification information obtaining module, configured to obtain the subscriber certification information from the first network terminal;
a gateway multimedia service proxy module, configured to complete access certification to the service network system by the use of the subscriber certification information obtained by the subscriber certification information obtaining module.

9. The gateway equipment according to claim 8, wherein the gateway multimedia service processing module further comprises:
a service capability query and decision-making module, configured to respond to a subscriber query request sent by the multimedia service proxy module, and obtain the subscriber certification information in the first network terminal by the use of the subscriber certification information obtaining module.

* * * * *